United States Patent [19]

Müller et al.

[11] 4,371,400

[45] Feb. 1, 1983

[54] MASTIC ASPHALT COMPOSITION

[75] Inventors: Karl-Hans Müller, Bruchköbel; Walter Barthel, Langenselbold, both of Fed. Rep. of Germany

[73] Assignee: Degussa Aktiengesellschaft, Frankfurt, Fed. Rep. of Germany

[21] Appl. No.: 294,657

[22] Filed: Aug. 20, 1981

[30] Foreign Application Priority Data

Sep. 27, 1980 [DE] Fed. Rep. of Germany ....... 3036537

[51] Int. Cl.³ .............................................. C08L 95/00
[52] U.S. Cl. ............................. 106/273 R; 106/281 R
[58] Field of Search ................................ 106/273, 281

[56] References Cited

FOREIGN PATENT DOCUMENTS 2848583 11/1978 Fed. Rep. of Germany .

OTHER PUBLICATIONS

Chem. Abst. 55:23970i, 1960, Brandt.

Primary Examiner—Theodore Morris
Attorney, Agent, or Firm—Beveridge, DeGrandi & Kline

[57] ABSTRACT

A mastic asphalt composition is disclosed which comprises, in addition to the mastic asphalt, 0.2 to 5 wt. % of a crystalline, powdered, synthetic zeolite or zeolite mixture. In addition, the mastic asphalt composition may further contain precipitated silica.

8 Claims, 3 Drawing Figures

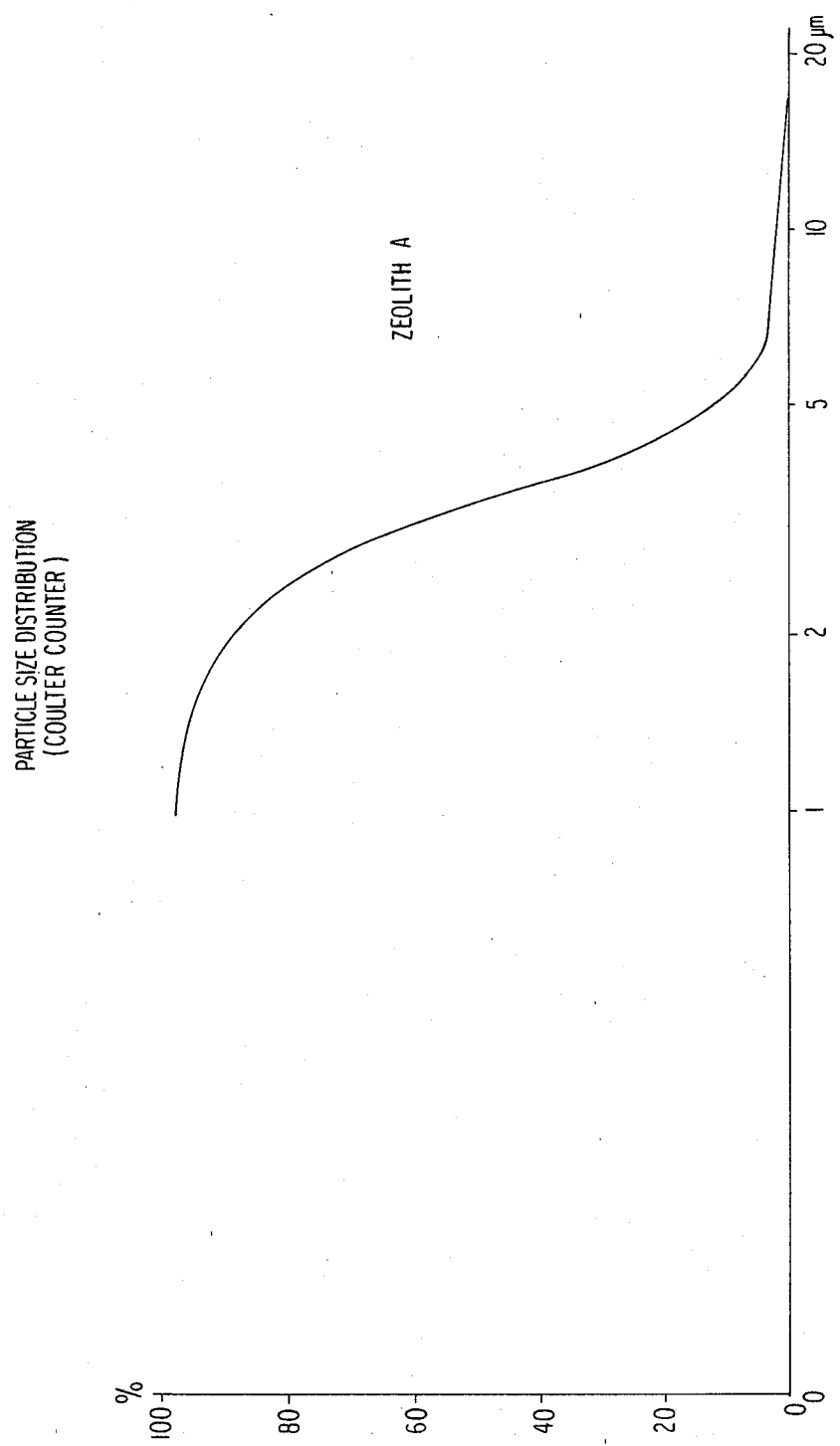

MASTIC ASPHALT COMPOSITION

Mastic asphalt is described in DIN (Deutsche Industrie-Norm=German Industrial Standard) 4109, Journal 4, page 3, section 5.3.5 (mastic asphalt coating), in DIN 18 354 in "Der Bundesanzeiger für Verkehr, Technische Vorschriften und Richtlinien für den Bau bituminöser Fahrbahndecken," Part 6, page 7, 1975 edition. (The Federal Informer for Traffic, Technical Specifications and Directives for the Construction of Bituminous Road Surfaces).

As specified therein, mastic asphalt is a dense bituminous substance formed from gravel, sand, filler and roadmaking bitumen or road-making bitumen and natural asphalt of which the mineral materials mixture is compounded with few voids. The binder content is adjusted to the voids in the mineral substance in such a way that these are completely filled when in the deposited state and a slight excess of binder is present. This mixture is pourable and workable in the hot state and needs no compaction upon laying down. The surface is subjected to after-treatment immediately after laying down of the mastic asphalt by roughening or smoothing.

A high creep strength (resistance to deformation) and if possible at the same time good workability is required of mastic asphalt for road and flooring construction. As a void-free asphalt of this kind does not undergo any vibratory or roller compaction, reasonable pourability or smoothability must be present. In road-construction, a majority of the surfaces to be coated with mastic asphalt are laid with road-equipment, so that even a material adjusted to a firmer consistency can laying can take place, such as e.g. in depressions, on bridges, on inclines, by ditches, etc. Here, only a flexible asphalt can be worked cleanly.

Special problems exist with respect to the laying of mastic asphalt industrial floors. The surface thicknesses range between 20–40 mm, whereby unevenness in the foundation must be taken into account. Satisfactory application of the hot asphalt substance as well as crack-free, low-resistance smoothing is necessary. The goal is always a high laying output by the labor gangs, as the price of the construction work to the ultimate consumer is very dependent on wages. With industrial floors which are improved by the laying process, a higher material cost is accepted if a price advantage arises in the final account.

Mastic asphalt mixtures can be adjusted to a firm consistency by controlled mineral composition (e.g. "large" fillers) or bitumen reduction to the minimum limit. The creep strength which is thereby increased is in any case at the expense of the laying output. It might be more suitable to aim for a higher resistance to deformation or a lower depth of impression and simultaneously good flexibility of the asphalt substances by means of effective additives.

Admixtures of precipitated silicas according to German OLS No. 28 48 583 in mastic asphalt yielded improvements in deformation stability and the reduction of fluctuations by means of binder dispersions, but at the same time with an impairment of workability. A construction engineering advantage substances is known. Natural minerals containing water of crystallization, e.g. calcium sulphate dihydrate ($CaSO_4.2H_2O$), are proposed as water donors therein.

The subject of the invention is a mastic asphalt mixture which contains 0.2 to 5 wt. % of a crystalline, powdered, synthetic zeolite or zeolite mixture, based on the weight of the total mixture.

In a particular embodiment of the invention, the mastic asphalt mixture may additionally contain 0.1 to 2 wt. % precipitated silica, based on the weight of the total mixture.

A precipitated silicic acid or a precipitated and spray dried silica may be used as the synthetic silica.

In a preferable embodiment, the mastic asphalt mixture may contain 0.1 to 1.2 wt. % of synthetic silicic acid.

The synthetic silica used may exhibit a BET surface area of 150 to 250 $m^2/g$.

A silicic acid with the following physico-chemical characteristic data may be used as a precipitated silica:

| | |
|---|---|
| Appearance | loose white powder |
| X-ray structure | amorphous |
| Surface area | 170 ± 25 $m^2/g$ (according to BET) |
| Average size of primary particles | 18 nanometers |
| Relative density | 2.05 g/ml |
| Degree of purity | $SiO_2$ 98% |
| | $Na_2O$ 1% |
| | $Al_2O_3$ 0.2% |
| | $SO_3$ 0.8% |
| Loss on drying[1] | 6% |
| Loss on calcining[2][3] | 5% |
| pH value[4] | 6.3 |
| Solubility | practically insoluble in water |
| Characteristic property | precipitated silicic acid |
| Compacted density[5] | 200 g/liter |
| Tailings according to Mocker (DIN 53 580) | 0.2% |

[1] DIN 53 198, process A
[2] based on the substance dried for 2 hours at 105° C., DIN 55 921
[3] DIN 52 911
[4] DIN 53 200
[5] DIN 53 194

As precipitated silica, there may be used a silica which exhibits the same physico-chemical characteristic data and is distinguished from the one mentioned above only in the degree of compacted density. The compacted density may amount to e.g. 70 g/l.

A silica with the following physico-chemical characteristic data may be used as a precipitated and spray dried silica:

| | | |
|---|---|---|
| Surface area according to BET | $m^2/g$ | 190 |
| Average size of primary particles | nanometers | 18 |
| Average size of secondary particles | micrometers | 80 |
| Compacted density (DIN 53 194) | g/l | 220 |
| Loss on drying (DIN 55 921) (2 hrs. at 105° C.) | % | 6 |
| Loss on calcining[1] (DIN 55 921) (2 hrs. at 1000° C.) | % | 5 |
| pH value (DIN 53 200) | | 6.3 |
| $SiO_2$ (DIN 55 921)[2] | % | 98 |
| $Al_2O_3$ | % | 0.2 |
| $Fe_2O_3$ | % | 0.03 |
| $Na_2O$ | % | 1 |
| $SO_3$ | % | 0.8 |
| Tailings according to Mocker (DIN 53 580) | % | 0.5 |
| Oil absorption (according to DIN 53 199) | g/100 g | 230 |

[1] based on the substance dried for 2 hours at 105° C.
[2] based on the substance calcined for 2 hours at 1000° C.

The same precipitated and spray dried silica may also be used in the pulverized state with an average size of secondary particles of e.g. 5 micrometers.

The term zeolite corresponds to the description according to D. W. Breck, "Zeolite molecular sieves," Wiley Interscience 1974, pages 133 to 180. The zeolites used may exhibit a water content of up to 27%.

The mastic asphalt mixture according to the invention may contain a zeolite type A as powdered crystalline synthetic zeolite. The zeolite A exhibits the general formula:

$$1.0 \pm 0.2 \; \frac{M_2O}{n} \cdot Al_2O_3 : 2.0 \pm 0.5 \; SiO_2 \cdot y \; H_2O$$

wherein M signifies a metal cation such as e.g. solution or potassium cation, n its valency and y a value up to 5.

Preferably, the mastic asphalt mixture may contain a zeolite type A which is prepared by methods according to German Nos. AS 23 33 068, AS 24 47 021, AS 25 17 218, OLS 26 51 485, OLS 26 51 446, OLS 26 51 436, OLS 26 51 419, OLS 26 51 420 and/or OLS 26 51 437. The zeolite A used may also be prepared by other known method, e.g. according to German Pat. Nos. 10 38 017 or OLS 16 67 620.

Preferably, the zeolite A used may exhibit the following physico-chemical data:

| | | |
|---|---|---|
| Particle distribution: proportion | <15 micrometers: | 99–100 wt. % |
| (Coulter counter) | <10 micrometers: | 95–99 wt. % |
| | <1 micrometer: | <5 wt. % |
| Loss on calcining according to DIN 55 921: | | <24% |

Furthermore, the mastic asphalt mixture according to the invention may contain as a powdered zeolite type Y with the general formula:

$$0.9 \pm 0.2 \; \frac{M_2O}{n} : Al_2O_3 \cdot X \; SiO_2 \cdot y \; H_2O$$

wherein M signifies a metal cation such as e.g. sodium or potassium cation, n its valency, X a value greater than 3 and y a value up to 9.

The zeolite Y used may exhibit the following physico-chemical characteristic data:

| | |
|---|---|
| Loss on calcining according to DIN 55 921 | <27% |
| Particle distribution (Coulter counter) | |
| Proportion <15 micrometers: | 96–100 wt. % |
| <10 micrometers: | 85–99 wt. % |
| <1 micrometer: | <20 wt. % |

This zeolite molecular sieve powder may be prepared for example according to German AS 10 98 929, German AS 12 03 239 or German AS 12 63 056.

Furthermore, the mastic asphalt mixture according to the invention may contain as a powdered zeolite a zeolite type X of the general formula:

$$0.9 \pm 0.2 \; \frac{M_2}{n} : Al_2O_3 : 2.5 \pm 0.5 \; SiO_2 \cdot y \; H_2O$$

wherein M signifies a metal cation e.g. sodium or potassium cation, n its valency and y a value up to 8.

This powdered zeolite may be prepared according to German Pat. Nos. 10 38 016, 11 38 383 or OLS 20 28 163.

The zeolite X may exhibit the following physico-chemical data:

| | |
|---|---|
| Loss on calcining (DIN 55 921) | 27 wt. % |
| Particle size distribution (Coulter counter) | |
| Proportion <15 micrometers: | 96–100 wt. % |
| <10 micrometers: | 85–99 wt. % |
| <1 micrometer: | 20 wt. % |

The zeolites used in accordance with this invention are hydrated; that is, y in the above formula for zeolite is a value greater than zero.

Furthermore, the mastic asphalt mixture according to the invention may contain as a powdered zeolite a zeolite type P. The term zeolite P is synonymous with the term synthetic phillipsite and zeolite B. For example, zeolite P may be prepared by the method according to French patent 1 213 628 (Bayer AG).

The zeolite P used may exhibit the following physico-chemical characteristics data:

| | |
|---|---|
| Loss on calcining (DIN 55 921) | 15 wt. % |
| Particle size distribution (Coulter counter) | |
| Proportion <15 micrometers: | 99–100 wt. % |
| <10 micrometers: | 97–99 wt. % |
| <1 micrometer: | 20 wt. % |

The mastic asphalt mixture according to the invention may further contain as a powdered zeolite, hydroxysodalite of the general formula:

$$Na_2O \cdot Al_2O_3 \cdot 2SiO_2 \cdot 2.5H_2O$$

Hydroxysodalite may be prepared for exampled from zeolite A by boiling in an aqueous caustic soda solution (cf. D. W. Breck "Zeolite molecular sieves," page 275 (1974), Wiley Interscience Publication).

The hydroxysodalite used may exhibit the following physico-chemical characteristic data:

| | |
|---|---|
| Loss on calcining (DIN 55 921) | 15 wt. % |
| Particle size distribution (Coulter counter) | |
| Proportion <15 micrometers: | 99–100 wt. % |
| <10 micrometers: | 90–99 wt. % |
| <1 micrometer: | 10 wt. % |

In a further embodiment of the invention, the mastic asphalt mixture according to the invention may contain a mixture consisting of the zeolites indicated. This mixture may be prepared both by mixing the pure zeolites and by direct synthesis using the precipitation method. Mixtures which can be prepared directly can be mixtures of zeolites A and P, zeolites A and X, zeolites A and hydroxysodalite, zeolites P and X or zeolites P and Y. In a preferable embodiment, the mastic asphalt mixture may contain a mixture of zeolite X and zeolite P in a ratio of 80 to 5:20 to 95.

A mixture of this kind may be prepared for example according to German No. OLS 20 28 163, page 15, table 3, example 3, by a precipitation method.

The addition of precipitated silica alone to the mastic asphalt substance leads to a reduction in depth of impression, i.e. an increase in deformation stability. Simultaneously the working temperature must be increased by 20° C., which indicates a reduction in workability of the mastic asphalt.

If crystalline synthetic zeolite is added to the asphalt mixture, the depth of impression and the working temperature are reduced.

If precipitated silica and crystalline synthetic zeolite are added to the mastic asphalt substance, the depth of impression is distinctly lowered, but the working temperature is increased only insignificantly. With a change in the ratio of precipitated silica and crystalline synthetic zeolite, corrections in temperature behaviour can be achieved. This means that zeolite added in increased amounts leads to more flexible mastic asphalt substances, and on its own achieves an increase in deformation stability, but the combination of precipitated silica produces the most distinct advantage in construction engineering within the test series.

The troublesome stability stiffening which has taken place for workability (pourability, spreadability and smoothability) by the addition of precipitated silica is changed by the dehydrating zeolite to a workable substance over a certain length of time. The surface which has cooled down after the completion of all working processes however then shows a lower depth of impression and/or an increased resistance to deformation, the zeolite itself further contributing to the improvement thereof. The combined use of precipitated silica and crystalline, synthetic zeolite leads to a mastic asphalt which is improved in stability and hence in load carrying capacity. This higher resistance to deformation is desirable in road-making in special applications. Special surfaces are used on bridges, highly frequented crossroads with traffic lights, inclines, etc. A high load carrying capacity is required of industrial floors. Workshops and stores should hold shelving, pallets, machinery, etc. The high loads are often transmitted to the floor only via small pressure bearing surfaces (shelf stands). Undesirable impressions are the result. The floor is driven over by fork lift trucks and other vehicles which transfer heavy loads to the floor and consequently leave behind tracks.

It is particularly advantageous that the improvement in stability of the mastic asphalt when the combined additive silica/zeolite is used is not at the expense of workability. Reduced m² (surface area) outputs of the laying gangs are not desirable as they have a negative effect on the price of the laid floor to the ultimate consumer with the high proportion of wages cost.

EXAMPLE

To verify the properties of the mastic asphalt according to the invention, comparative tests were carried out with a known mastic asphalt mixture.

With respect to mineral composition and type of bitumen, a mastic asphalt mixture with the following composition was used:

| | |
|---|---|
| 29 parts by wt. | double-broken moraine chippings 2/5mm |
| 41 parts by wt. | natural sand 0/2 mm (washed |
| 30 parts by wt. | ground limestone |
| 100 parts by wt. | mineral |
| 10.5 parts by wt. | bitumen B 45/hard grade bitumen = 95 wt. % |
| 110.5 parts by wt. | mastic asphalt |

A mixture of 65 wt. % bitumen B 45 and 35 wt. % hard grade bitumen with a ring and ball softening point of 69° C. was selected as binder.

To obtain a clearer spread of the results, the mastic asphalt mixture was adjusted to a relatively soft consistency. The binder content and the type of bitumen were adjusted thereto.

With a constant binder content of 9.5 wt. %, addition of the powdered additives took place in wt. %, based on the total substance of the mastic asphalt, wherein the proportion of ground limestone was reduced by the respective amount.

In detail the mastic asphalt mixtures were tested.

TABLE 1

| Mixture No. | Binder Bitumen B/45hard Bitumen wt. % | Moraine wt. % | Natural Sand wt. % | Ground Limestone wt. % | Precipitated silica wt. % | Zeolite wt. % |
|---|---|---|---|---|---|---|
| 1 | 9.5 | 26.2 | 37.1 | 27.2 | — | — |
| 2 | 9.5 | 26.2 | 37.1 | 26.7 | 0.5 | — |
| 3 | 9.5 | 26.2 | 37.1 | 26.2 | — | 1 |
| 4 | 9.5 | 26.2 | 37.1 | 25.7 | 0.5 | 1 |

A spray dried silica with the following physicochemical characteristic data was used as precipitated silica:

| | | |
|---|---|---|
| Surface area according to BET | m²/g | 190 |
| Average size of primary particles | nanometers | 18 |
| Average size of secondary particles | micrometers | 80 |
| Compacted density (DIN 53 194) | g/l | 220 |
| Loss on drying (DIN 55 921) (2 hrs. at 105° C.) | % | 6 |
| Loss on calcining[1] (DIN 55 921) (2 hrs. at 1000° C.) | % | 5 |
| pH value (DIN 53 200) | | 6.3 |
| $SiO_2$ (DIN 55 921)[2] | % | 98 |
| $Al_2O_3$ | % | 0.2 |
| $Fe_2O_3$ | % | 0.03 |
| $Na_2O$ | % | 1 |
| $SO_3$ | % | 0.8 |
| Tailings according to Mocker (DIN 53 580) | % | 0.5 |
| Oil adsorption (according to DIN 53 199) | % | 230 |

[1] based on the substance dried for 2 hours at 105° C.
[2] based on the substance dried for 2 hours at 1000° C.

As zeolite, there is used a zeolite type A which was prepared according to German OLS No. 26 51 436 and exhibits the particle spectrum according to FIG. 3.

Workability

Addition of the additives alters the workability of the material. Furthermore, however, workability can also be controlled via the mixture composition as well as the type of binder and the working temperature.

In order to detect the effect of the additives on workability, the working temperature was varied, with otherwise constant mixture composition. A measure of workability therein is the working temperature necessary to obtain a particular consistency of the mixture.

The consistency was defined as the discharge time of 35 seconds over an inclined plane with constant inclination and constant dimensions. That is, the temperature which is necessary for discharge of the mixture over the inclined plane in 35 seconds was determined at any given time.

The results ascertained are compiled in Table 2.

TABLE 2

| Mixture No. | Addition Precipitated Silica wt. % | Addition Zeolite wt. % | Necessary Working Temperature °C. |
|---|---|---|---|
| 1 | — | — | 220 |
| 2 | 0.5 | — | 240 |
| 3 | — | 1 | 210 |
| 4 | 0.5 | 1 | 230 |

To determine the creep strength of the individual mixtures, the impression test was carried out with the same ram according to DIN 1996, Part 13.

Therein, in addition to the testing which is usual with flooring, at 22° C., and the 1 cm² ram, testing was also performed at 40° C. and with the 5 cm² ram.

The values ascertained are quoted in Table 3.

TABLE 3

| Mixture No. | Depth of Impression (mm) | | | |
|---|---|---|---|---|
| | 22° C./5$^h$ | 40° C./0.5$^h$ | 40° C./1$^h$ | 40° C./1.5$^h$ |
| 1 | 6.6 | 5.6 | 7.1 | 8.1 |
| 2 | 3.9 | 3.4 | 4.1 | 4.5 |
| 3 | 4.6 | 4.0 | 5.0 | 5.5 |
| 4 | 2.9 | 2.3 | 2.7 | 2.9 |

Figure 1:
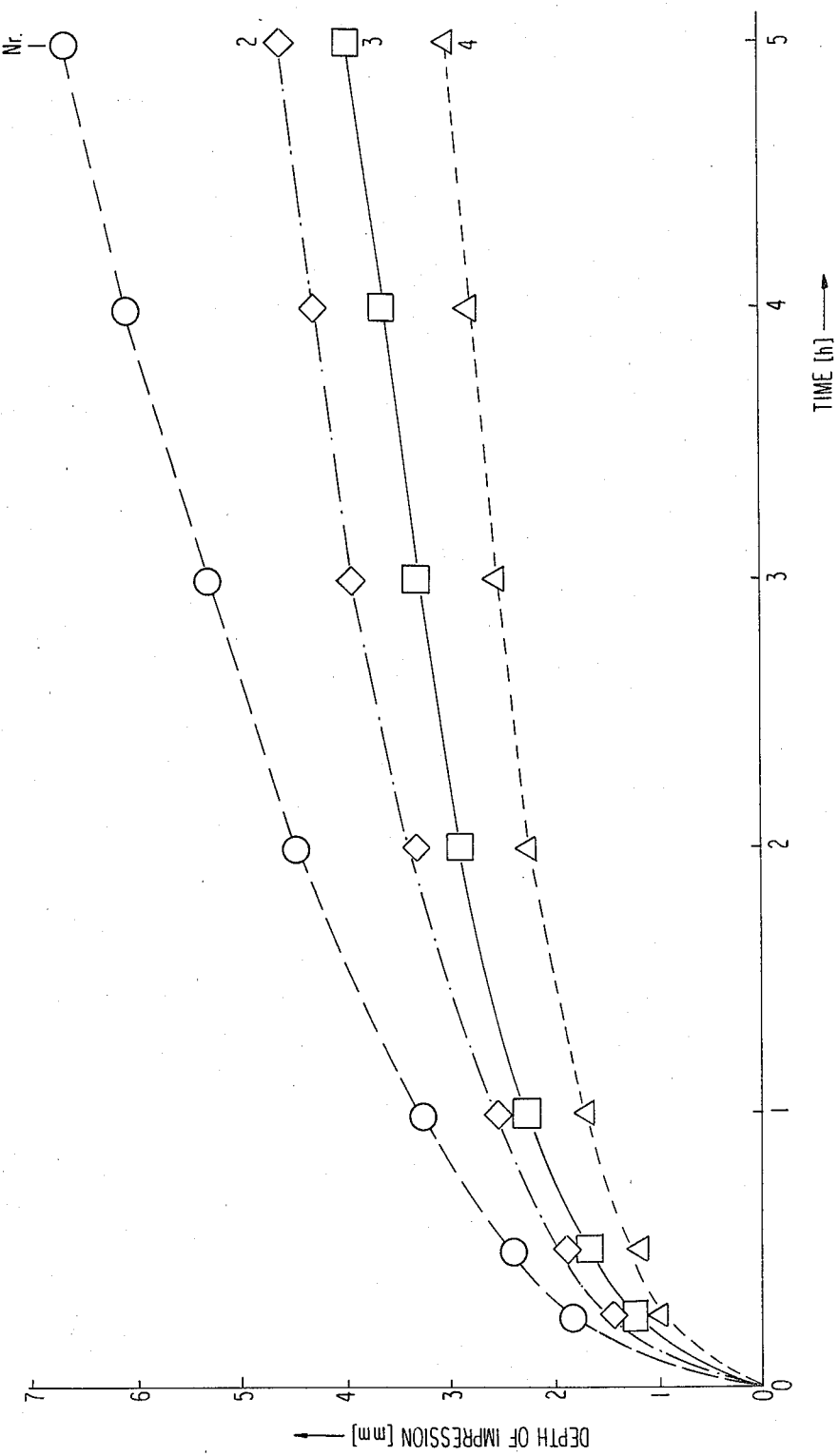
FIG. 1 shows the depth of impression as dependent upon the testing time at 22° C. and 1 m² compacted area.
Figure 2:
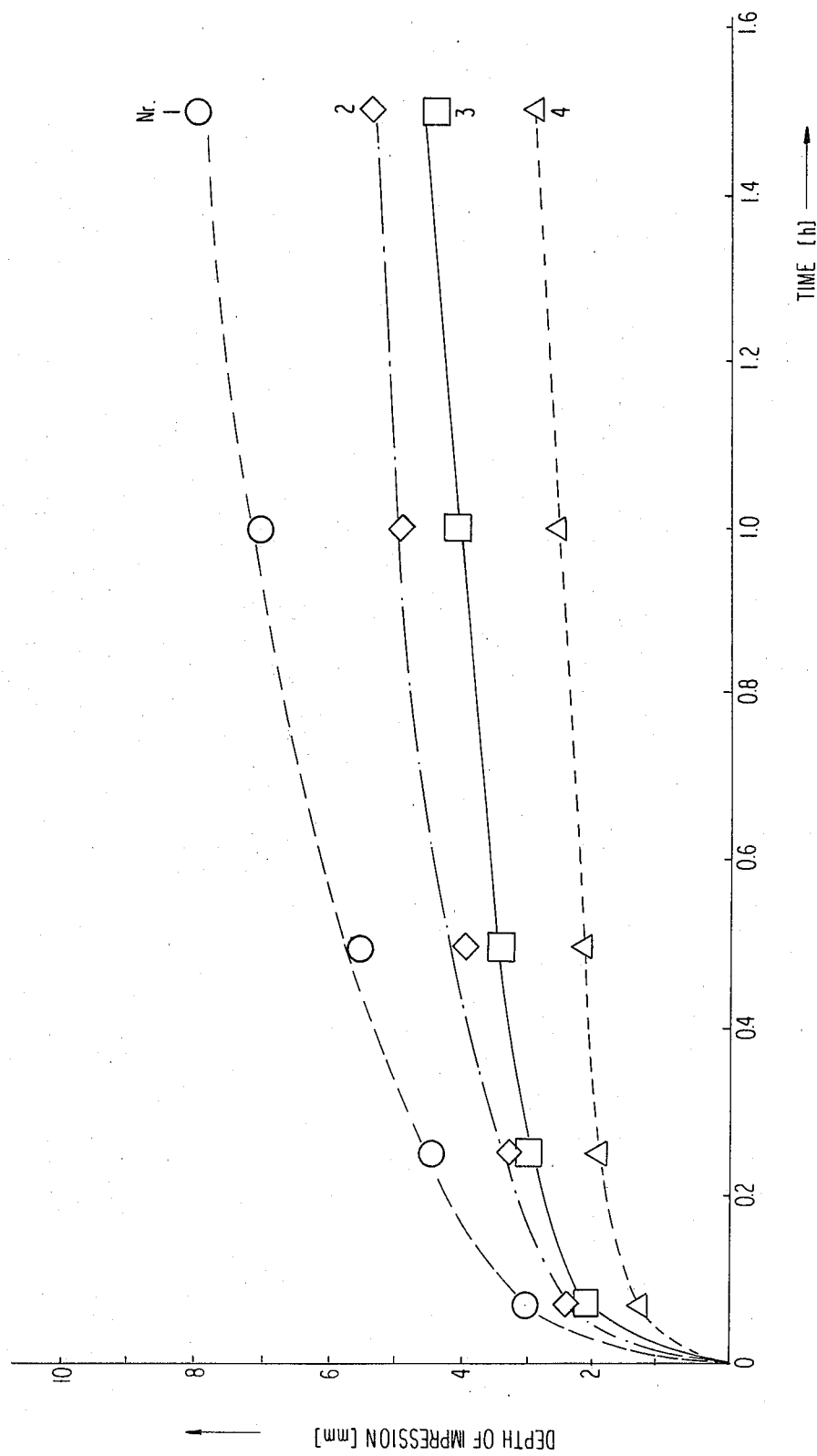
FIG. 2 shows the depth of impression as dependent upon the testing time at 40° C. and 5 cm² compacted area.

The course of the depth of impression as dependent upon the testing time is shown graphically in FIGS. 1 and 2.

FIG. 1 shows the depth of impression as dependent upon the testing time at 22° C. and with 1 cm² ram area.

FIG. 2 shows the depth of impression as dependent upon the testing time at 40° C. and with 5 cm² ram area.

Both the addition of precipitated silica and the addition of crystalline, synthetic, powdered zeolite reduce the depth of impression compared with the known mastic asphalt mixture, wherein distinctly more favourable values are yielded with precipitated silica. Whereas however with the addition of precipitated silica the working temperature must be increased by 20° C. to 240° C., workability is improved by the addition of crystalline, synthetic, powdered zeolite.

The combined use of 0.5 wt. % precipitated silica and 1 wt. % crystalline, synthetic, powdered zeolite produces a considerable reduction in depth of impression with only an insignificant increase in working temperature of 10° C.

In this combined use, in which the creep strength of the substance is improved substantially, but the workability is altered disadvantageously only insignificantly, unequivocal advantages of the mastic asphalt mixture according to the invention are to be seen.

We claim:

1. A mastic asphalt composition comprising mastic asphalt and 0.2 to 5 wt. % of at least one crystalline, powdered, synthetic zeolite based on the total mixture.

2. The mastic asphalt composition according to claim 1, which additionally contains 0.1 to 2 wt. % precipitated silica, based on the total composition.

3. The mastic asphalt composition according to claim 1, which additionally contains 0.1 to 1.2 wt. % precipitated silica, based on the total composition.

4. The mastic asphalt composition according to claim 1 wherein the zeolite is a type A zeolite which has the formula:

$$1.0 \pm 0.2 \, \frac{M_2O}{n} \cdot Al_2O_3 : 2.0 \pm 0.5 \, SiO_2 . y \, H_2O$$

wherein M is a metal cation, n is the valency thereof and y has the value up to 5.

5. The mastic asphalt composition according to claim 1 wherein the zeolite is a type Y zeolite which has the formula:

$$0.9 \pm 0.2 \, \frac{M_2O}{n} : Al_2O_3 . X \, SiO_2 . y \, H_2O$$

wherein M is a metal cation, n is the valency thereof, X has a value greater than 3 and y has a value lower than 9.

6. The mastic asphalt composition according to claim 1 wherein the zeolite is a type X zeolite which has the formula:

$$0.9 \pm 0.2 \, \frac{M_2 : Al_2O_3 : 2.5 \pm 0.5 \, SiO_2 . y \, H_2O}{n}$$

wherein M signifies a metal cation, n is the valency thereof and y is the value up to 8.

7. The mastic asphalt composition according to claim 1, wherein the zeolite is a type P zeolite.

8. The mastic asphalt composition according to claim 1 wherein the zeolite is hydroxysodalite having the formula:

$$Na_2O \cdot Al_2O_3 \cdot 2SiO_2 \cdot 2.5H_2O.$$

* * * * *